United States Patent
Blum et al.

(10) Patent No.: US 6,901,559 B1
(45) Date of Patent: May 31, 2005

(54) METHOD AND APPARATUS FOR PROVIDING RECENT CATEGORIES ON A HAND-HELD DEVICE

(75) Inventors: Jeffrey R. Blum, Seattle, WA (US); Elizabeth A. Bastiaanse, Cambridge, MA (US); Ido Ben-Shachar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 09/559,695

(22) Filed: Apr. 27, 2000

Related U.S. Application Data

(60) Provisional application No. 60/175,108, filed on Jan. 6, 2000.

(51) Int. Cl.[7] .................................................. G09G 5/00
(52) U.S. Cl. ........................ 715/811; 715/739; 715/825; 715/841
(58) Field of Search ................................. 345/810, 811, 345/812, 813, 815, 821, 828, 825; 715/841, 864, 739; 455/460, 459, 412, 413, 414, 415, 416, 461

(56) References Cited

U.S. PATENT DOCUMENTS

| | | | | |
|---|---|---|---|---|
| 5,987,375 A | * | 11/1999 | Tamai | ........................ 701/200 |
| 6,259,449 B1 | * | 7/2001 | Saxena et al. | ............... 345/853 |
| 6,285,364 B1 | * | 9/2001 | Giordano et al. | ............ 345/804 |
| 6,295,355 B1 | * | 9/2001 | O'Neal et al. | .......... 379/355.05 |
| 6,300,946 B1 | * | 10/2001 | Lincke et al. | ................ 345/700 |
| 6,317,781 B1 | * | 11/2001 | De Boor et al. | ............. 709/217 |
| 6,389,124 B1 | * | 5/2002 | Schnarel et al. | ........ 379/142.01 |
| 6,473,496 B1 | * | 10/2002 | Mohageg | .................. 379/90.01 |
| 6,516,202 B1 | * | 2/2003 | Hawkins et al. | .......... 455/556.2 |
| 2001/0043687 A1 | * | 11/2001 | Tidwell et al. | .......... 379/110.01 |

* cited by examiner

*Primary Examiner*—Ba Huynh
(74) *Attorney, Agent, or Firm*—Theodore M. Magee; Westman, Champlin & Kelly, P.A.

(57) ABSTRACT

The present invention adds a new category of contacts and tasks to hand-held devices. This new category provides a list of the most recent contacts or tasks that the user has accessed. Under most embodiments, the contacts and tasks shown in the RECENT list may be manipulated by the user in the same manner in which contacts and tasks are manipulated in other lists on the hand-held device. Thus, the user is shown the actual contacts or tasks entries and not just a link to those entries. Under most embodiments, the user is able to display a list of recent contacts and tasks by accessing a "RECENT" entry in a categories list provided on many hand-held devices.

16 Claims, 7 Drawing Sheets

| Contacts | | | | | | 2:36p |
|---|---|---|---|---|---|---|
| All Categories ▼ | | | | | | |
| #ab | cde | fgh | ijk | lmn | opq | rst | uvw | xyz |

302 → All Categories

| Abbar, Anas | 425 882-8080 w |
| Abercrombie, Kim | 425 888-8900 h |
| Akers, Kim | 425 887-0098 w |
| Akhtar, Sarah | 312 227-0090 w |
| Alboucq, Steve | 425 887-0099 w |
| Anderson, Amy | 312 225-0900 w |
| Anderson, Charlie | 425 808-5643 w |
| Atkinson, Teresa | 425 654-4890 h |
| Bacon Jr., Dan K. | 425 388-3098 w |
| Baldwin, Arnie | 312 247-4490 w |
| Barbariol, Angela | 425 587-5599 w |

300

New    Tools

FIG. 3

| Contacts | 2:36p |
|---|---|
| Show ▼ | |

| Recent |
| ✓ All Categories |
| Family |
| Work |

| lmn | opq | rst | uvw | xyz |

| Akhtar, Sarah | |
| Alboucq, Steve | 425 882-8080 w |
| Anderson, Amy | 425 888-8900 h |
| Anderson, Charlie | 425 887-0098 w |
| Atkinson, Teresa | 312 227-0090 w |
| Bacon Jr., Dan K. | 425 887-0099 w |
| Baldwin, Arnie | 312 225-0900 w |
| Barbariol, Angela | 425 808-5643 w |
| | 425 654-4890 h |
| | 425 388-3098 w |
| | 312 247-4490 w |
| | 425 587-5599 w |

304

New    Tools

FIG. 4

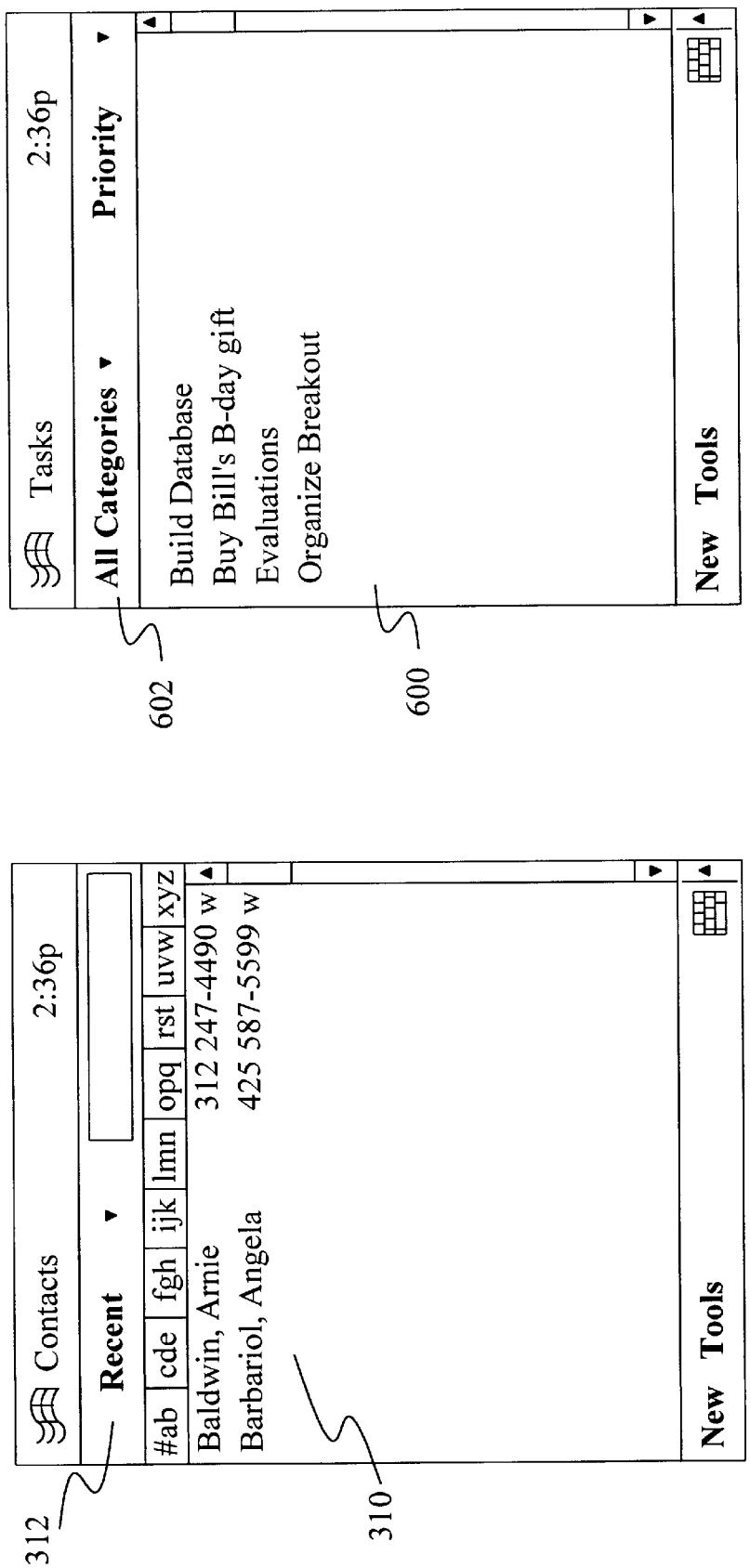

METHOD AND APPARATUS FOR PROVIDING RECENT CATEGORIES ON A HAND-HELD DEVICE

REFERENCE TO RELATED APPLICATION

The present application claims priority from a U.S. Provisional application having Ser. No. 60/175,108, filed on Jan. 6, 2000 and entitled "METHOD AND APPARATUS FOR PROVIDING RECENT CATEGORIES ON A HAND-HELD DEVICE."

Reference is hereby made to the following co-pending U.S. patent applications, which are all assigned to the same assignee as the present application: "METHOD AND APPARATUS FOR FAST SEARCHING OF HAND-HELD CONTACTS LISTS", having Ser. No. 07/562,689; "SMART COLUMN FOR CONTACT INFORMATION ON PALM-SIZED COMPUTING DEVICES AND METHOD AND APPARATUS FOR DISPLAYING THE SAME", having Ser. No. 09/564,515; "USER INTERFACE FOR PALM-SIZED COMPUTING DEVICES AND METHOD AND APPARATUS FOR DISPLAYING THE SAME", having Ser. No. 09/564,928; and "METHOD AND APPARATUS FOR PROVIDING CONTEXT MENUS ON A PEN-BASED DEVICE", having Ser. No. 09/559,694.

BACKGROUND OF THE INVENTION

The present invention relates to hand-held computing devices. In particular, the present invention relates to user interfaces on hand-held devices.

Hand-held computing devices have gained a niche as personal organizers. These devices allow users to view lists of contacts, tasks or calendar events.

One problem with such devices is that they have a limited sized screen. As such, they are only able to show a portion of the information stored on them. For example, a typical Contacts database has several hundred entries in it. However, on a hand-held device, a user can typically only view 14 contact entries at a time. Without a keyboard, this can make finding a contact or task entry cumbersome. Thus, an improved user interface is needed that improves the user's ability to view the entries that are most important to them.

In some current desktop systems, a special folder is created by the computer's operating system to help users locate files that they have recently accessed. For example, in the Windows 98 operating system from Microsoft Corporation of Redmond, Wash., a folder named "RECENT" is automatically created. This RECENT folder does not contain the actual files, but instead contains a short-cut or link to the files. Thus, the links describe where the files are located on the system. Because the links in the RECENT file are not the actual files, deleting or moving the link does not delete or move the actual file. Instead, it simply deletes or moves the link. As such, to perform operations on the actual file, or filename, the user must first locate the file in the system.

SUMMARY OF THE INVENTION

The present invention adds a new category of contacts and tasks to hand-held devices. This new category provides a list of the most recent contacts or tasks that the user has accessed. Under most embodiments, the contacts and tasks shown in the RECENT list may be manipulated by the user in the same manner in which contacts and tasks are manipulated in other lists on the hand-held device. Thus, the user is shown the actual contacts or tasks entries and not just a link to those entries.

Under most embodiments, the user is able to display a list of recent contacts and tasks by accessing a "RECENT" entry in a categories list provided on many hand-held devices. In some embodiments, this categories list includes other user-defined categories such as "PERSONAL" and "BUSINESS". The user does not have to perform any functions to generate the RECENT category because the system of the present invention automatically updates the RECENT list whenever the user opens, edits or receives a contact or task.

BRIEF DESCRIPTION OF THE DRAWINGS

FIG. 3 is a screen-shot of a display showing a portion of a full contacts list.

FIG. 4 is a screen-shot of a display showing a categories list over a portion of a full contacts list.

FIG. 5 is a screen-shot of a display showing a recent contacts list.

FIG. 6 is a screen-shot of a display showing a full tasks list.

DETAILED DESCRIPTION OF ILLUSTRATIVE EMBODIMENTS

Figure 1:
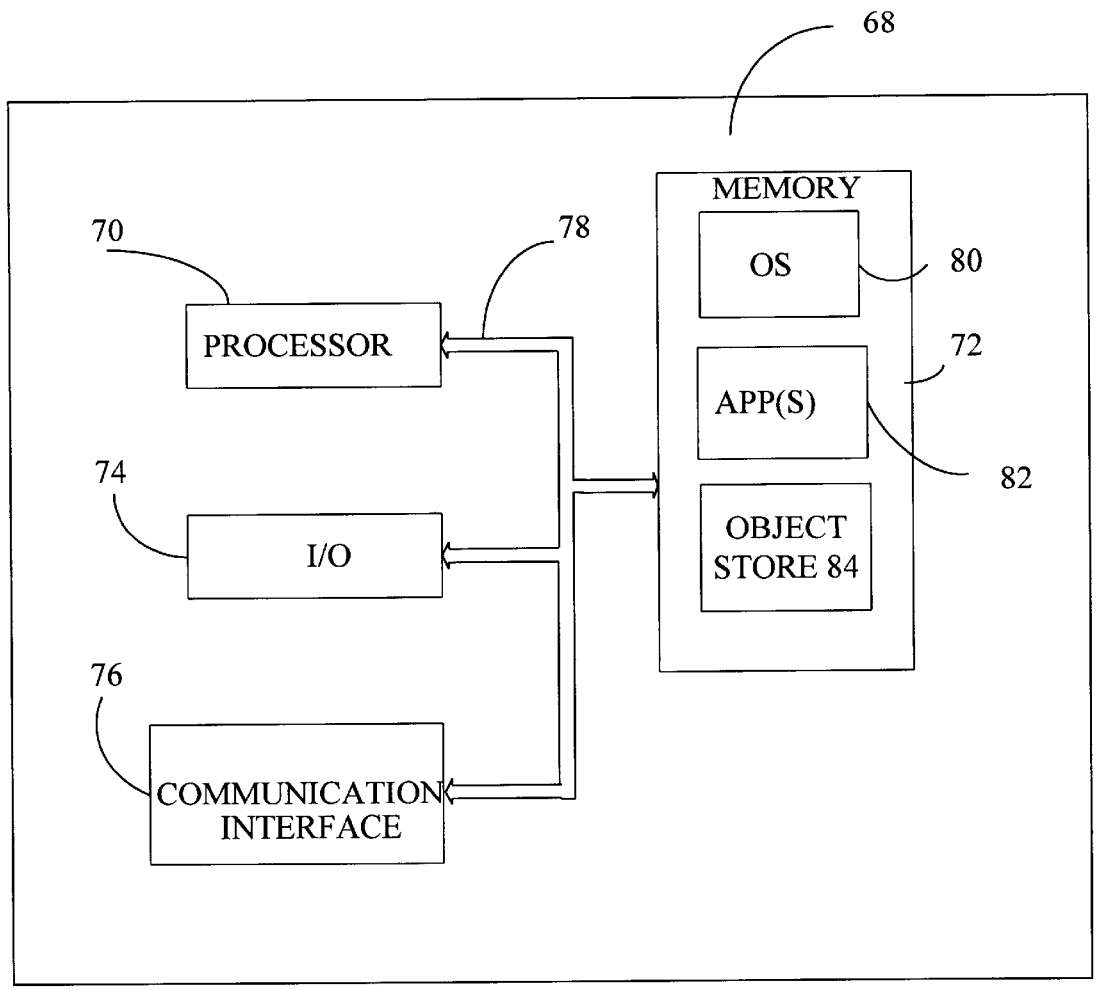
FIG. 1 is a block diagram of a mobile computing environment in which many embodiments of the present invention may be practiced.

FIG. 1 is a block diagram of a mobile device 68, which is an exemplary computing environment for the present invention. Mobile device 68 includes a microprocessor 70, memory 72, input/output (I/O) components 74, a communication interface 76 for communicating with, for example, a separate computer or mobile device. In one embodiment, the afore-mentioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disk drive.

Memory 72 includes an operating system 80, application programs 82 as well as an object store 84. During operation, operating system 80 is preferably executed by processor 70 from memory 72. Operating system 80, in one preferred embodiment, is a "WINDOWS CE" brand operating system commercially available from Microsoft Corporation. Operating system 80 is preferably designed for mobile devices, and implements database features that can be utilized by applications 82 through a set of exposed application programming interfaces and methods. The objects in object store 84 are maintained by applications 82 and operating system 80, at least partially in response to calls to the exposed application programming interfaces and methods.

Communication interface 76 represents numerous devices and technologies that allow mobile device 68 to send and receive information. The devices include wired and wireless modems, satellite receivers and broadcast tuners to name a few. Mobile device 68 can also be directly connected to a computer to exchange data therewith. In such cases, communication interface 76 can be an infrared transceiver or a serial or parallel communication connection, all of which are capable of transmitting streaming information.

Figure 2:
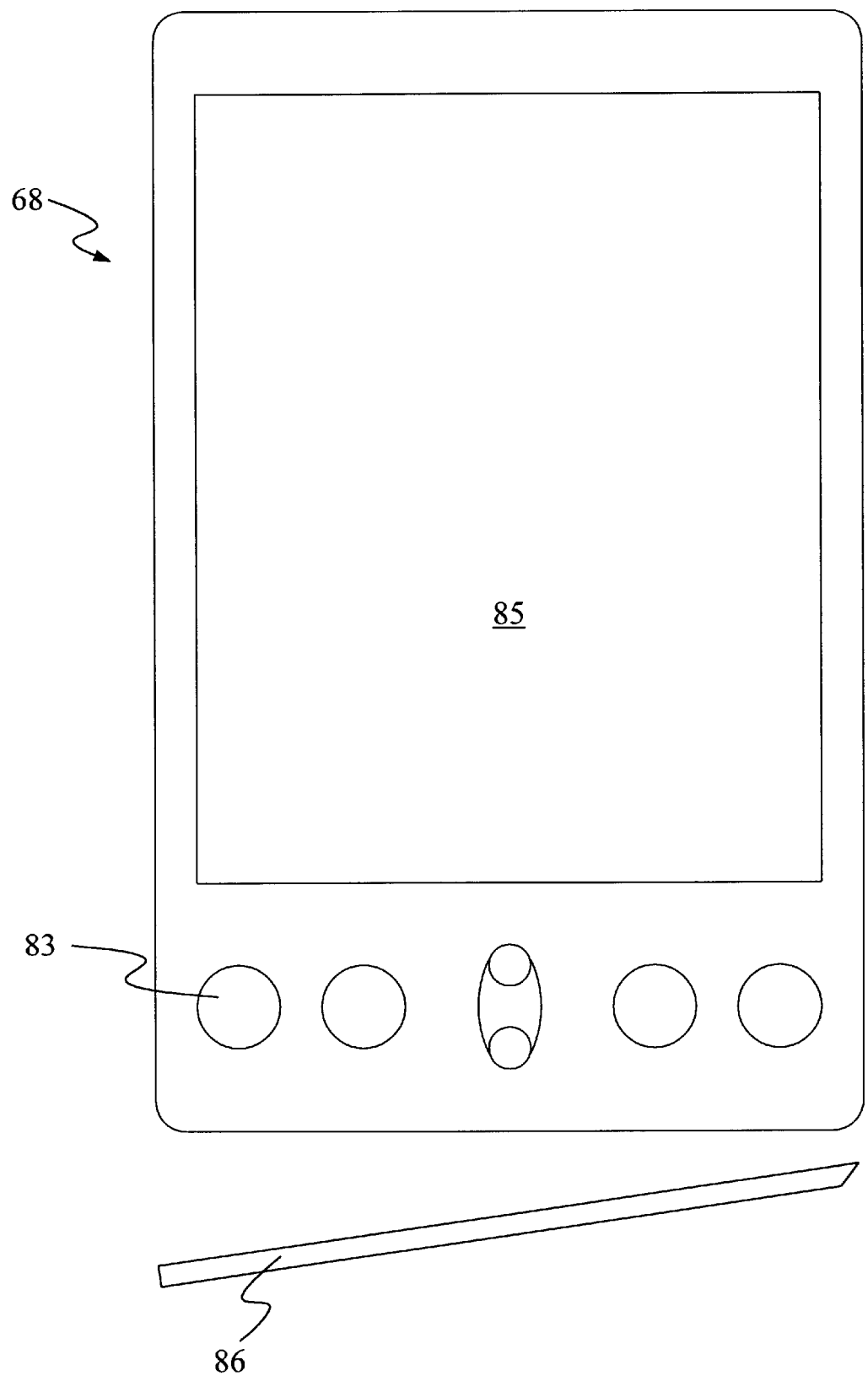
FIG. 2 is a front view of a mobile computing device on which many embodiments of the present invention may be practiced.

FIG. 2 is a simplified pictorial illustration of mobile device 68. Mobile device 68 can be a desktop assistant sold under the designation H/PC or a palm-size PC designated as P/PC having software provided by the Microsoft Corporation. In one embodiment, mobile device 68 includes a set of control buttons 83, display 85 and stylus 86. In the embodiment shown in FIG. 2, display 85 is a liquid crystal display (LCD) which uses a contact sensitive display screen in conjunction with stylus 86. Stylus 86 is used to press or contact display 85 at designated coordinates to accomplish certain user input functions. In some embodiments, a miniaturized keyboard with alpha-numeric keys is provided with the mobile device. In other known embodiments, a "soft" keyboard is provided through the contact sensitive display screen. In yet other embodiments, a character recognition module is employed to recognize characters written on the contact sensitive display screen using stylus 86.

Several applications for mobile device 68 display lists of entries to the user. These entries typically show one or more fields from a set of records stored in a database. For example, some contacts applications display the name and phone number fields of a contacts database. Similarly, some task applications display lists of tasks to the user. FIG. 3 provides an example of a display generated by a contacts application. The display includes a contacts list 300 that shows eleven contacts.

In most mobile devices, users can perform functions on the displayed entries. These functions affect both the displayed entry and the entry's record in the database. For example, by invoking the delete command on an entry, a user can remove the entry from the display and at the same time remove the entry's record from the database. Similarly, by selecting an entry, the user can view the full record for the entry. From this full record view, the user can edit the fields of the record.

To help users manage large database lists, some mobile devices of the prior art allow users to group their list entries into categories. Using categories, the user can denote that a specific contact is a "Work" contact or a "School" contact, etc. When the user selects a category, only the entries within the category are displayed. This makes it easier for the user to find a particular entry.

When an entry is displayed based on its inclusion in a category, the user is able to manipulate the entry in the same manner as when the entry is viewed in the full list. Thus, the user may delete or edit an entry in the same manner whether they are viewing a small category list or the full list of entries. This makes it easier for users to interact with the hand-held device since the operation of the device is consistent regardless of how the user chooses to view their entries.

Although the categories of the prior art allowed users to group contacts based on common elements between entries, the categories did not provide the user with an automatic means for grouping entries in a category. Instead, under the prior art, the user had to take several steps to create and populate the categories.

The present inventors have recognized that when a user accesses an entry, that entry is likely to be relevant to the user over some period of time. During that period, the user will access the entry several times. For example, if the user is having remodeling work done on their home, repair work done on their car, and are trying to arrange a vacation, they may be calling their contractor, mechanic and travel agent several times in the same week.

Based on these observations, the present inventors have developed a user interface to make it easier for users to find the entries that are most relevant to them. Under the present invention, this is accomplished by automatically generating a new category that lists the most recently accessed entries. Under some embodiments, this category appears along with all other user-defined categories in a drop-down category list that can be accessed by tapping a menu label such as "All Categories" label 302 of FIG. 3.

An example of a display showing a list of categories 304 is shown in FIG. 4 with the "Recent" category label at the top of the list.

If the user selects the "Recent" entry in list 304, the drop down list disappears and the recently accessed entries are displayed as a new contact list 310 as shown in FIG. 5. When viewing the recent category of contacts, Recent label 312 appears on the display.

As with other categories, entries in the "Recent" category are displayed in the same format as entries in the full list and can be manipulated in the same manner as entries in the full list. In particular, changes to the entry in the "Recent" category result in changes to the database record for that entry. Thus, if the user selects an entry in the "Recent" category and then invokes the DELETE command, the entry is removed from the display and the entry's record is removed from the database. After the entry's record is removed from the database, the entry will no longer appear in any displayed category list nor in the full list of entries.

In other words, the entries displayed in the "Recent" category are not just links to an entry but are the actual entry. Thus, the same operations that can be performed on an entry in the full list of entries can be performed on an entry in the "Recent" category list. For example, under some embodiments, multiple entries in the recent category list may be selected at the same time and then may be moved to a different category using a menu command. Other commands include things such as sending the entry over an Infra-Red (IR) link to another computing device or moving the entry to a storage card.

Figure 8:
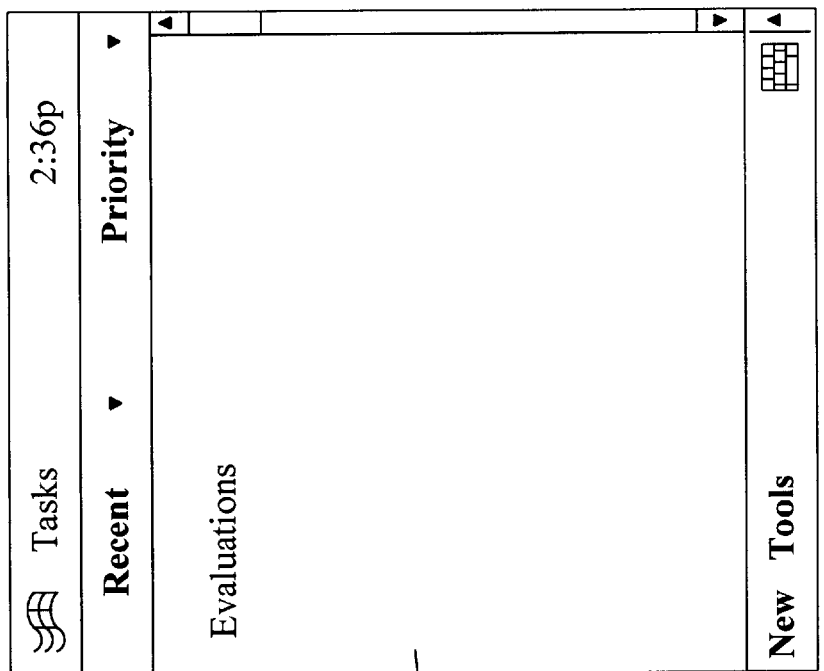
FIG. 8 is a screen-shot of a display showing a recent tasks list.
Figure 7:
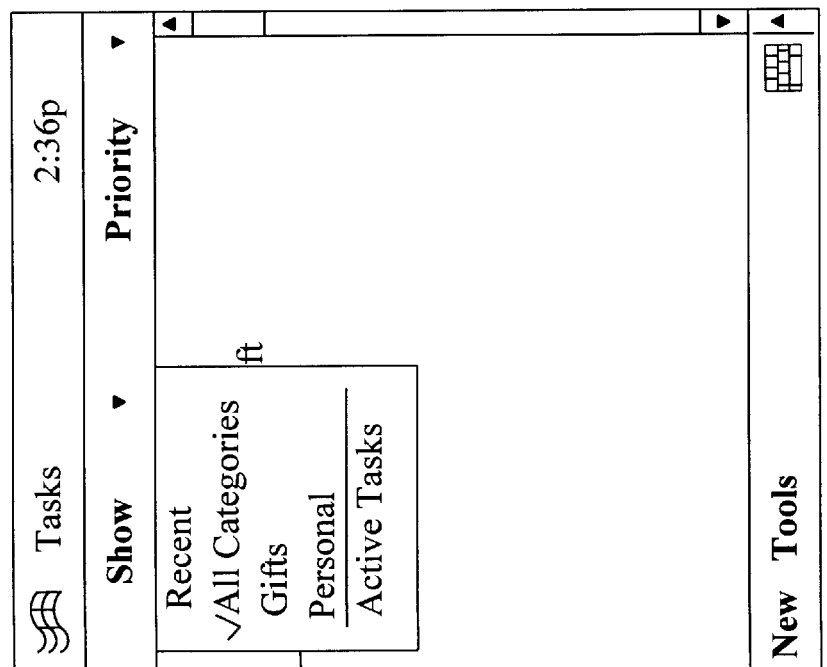
FIG. 7 is a screen-shot of a display showing a categories list over a full tasks list.

The present invention is not limited to Contacts applications. It is generally useful for any system where there is a persistent large list of data. For example, in one embodiment, the recent category is added to the list of categories for a Tasks manager application. FIG. 6 provides an example of an image displayed by the task manager showing a task list 600 and an "All Categories" label 602. If the user selects label 602, a list of categories 604, including the recent category, is displayed as shown in FIG. 7. If the user selects the recent category, a new task list 606 is displayed in FIG. 8, which contains only the most recent tasks that have been accessed.

Figure 9:
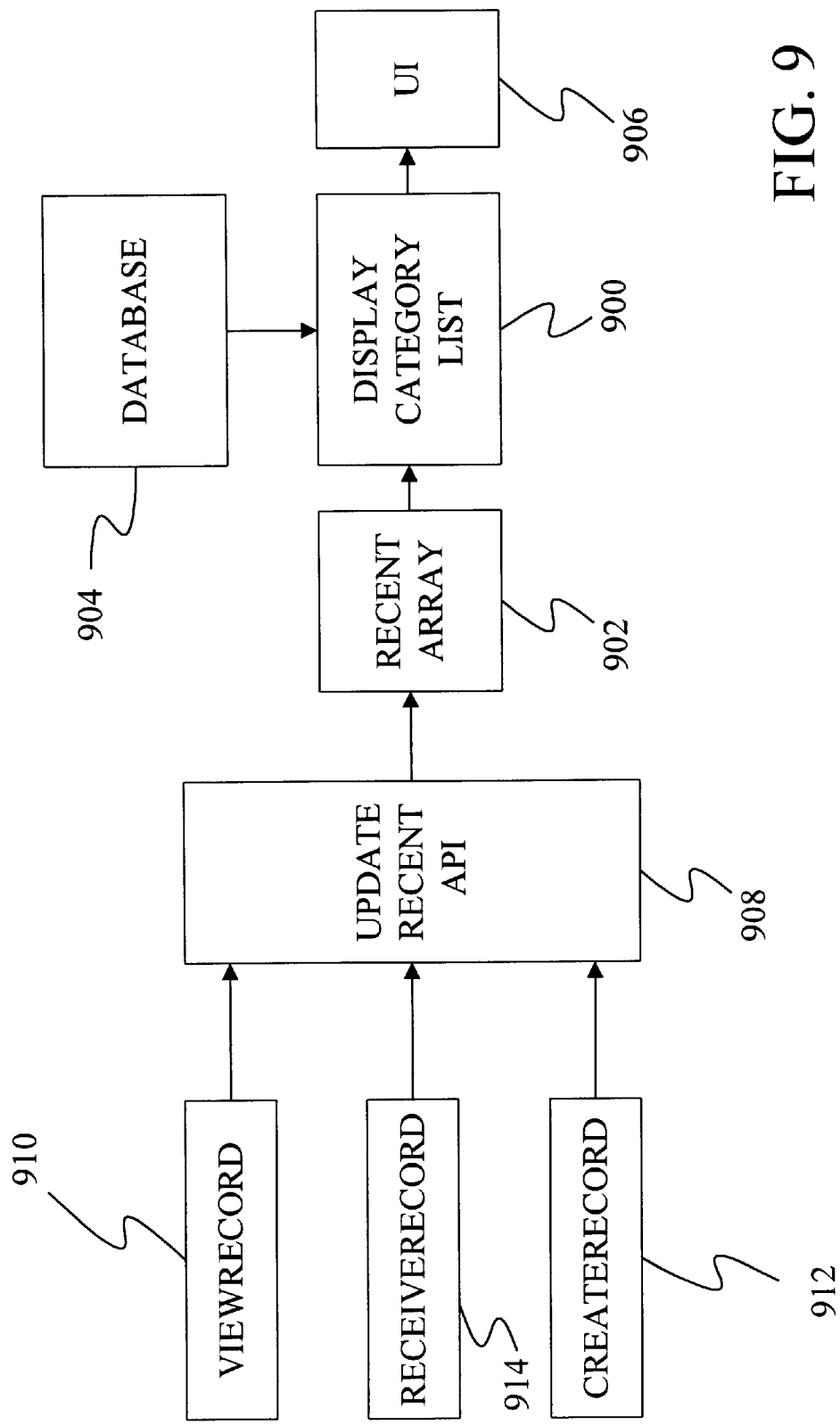
FIG. 9 is a block diagram of software components found in many embodiments of the present invention.

FIG. 9 provides a block diagram of software components that are involved in updating and displaying a recent category list. To display the recent category list, a display category list component 900 accesses a recent category array or list 902, which contains a list of the record IDs of the last "n" accessed records. (where "n" is the maximum number of entries that can be stored in the recent list and in many embodiments is equal to fourteen). Using this list of ID's, display category list component 900 retrieves the relevant display information for the most recently accessed entries from a database 904. This display information is then passed to a user interface component 906, which displays the information.

Under most embodiments, Recent array 902 is updated each time a record is accessed, received or created. In FIG. 9, records are accessed by a ViewRecord component 910, are received by a ReceiveRecord Component 914, and are created by a CreateRecord component 912. As part of their operation, each of these components calls an UpdateRecent component 908, which updates recent array 902 to reflect the latest event. In one embodiment, a record is considered to have been accessed when a substantial portion of the record is viewed by the user or when the user edits some portion of the record.

Figure 10:
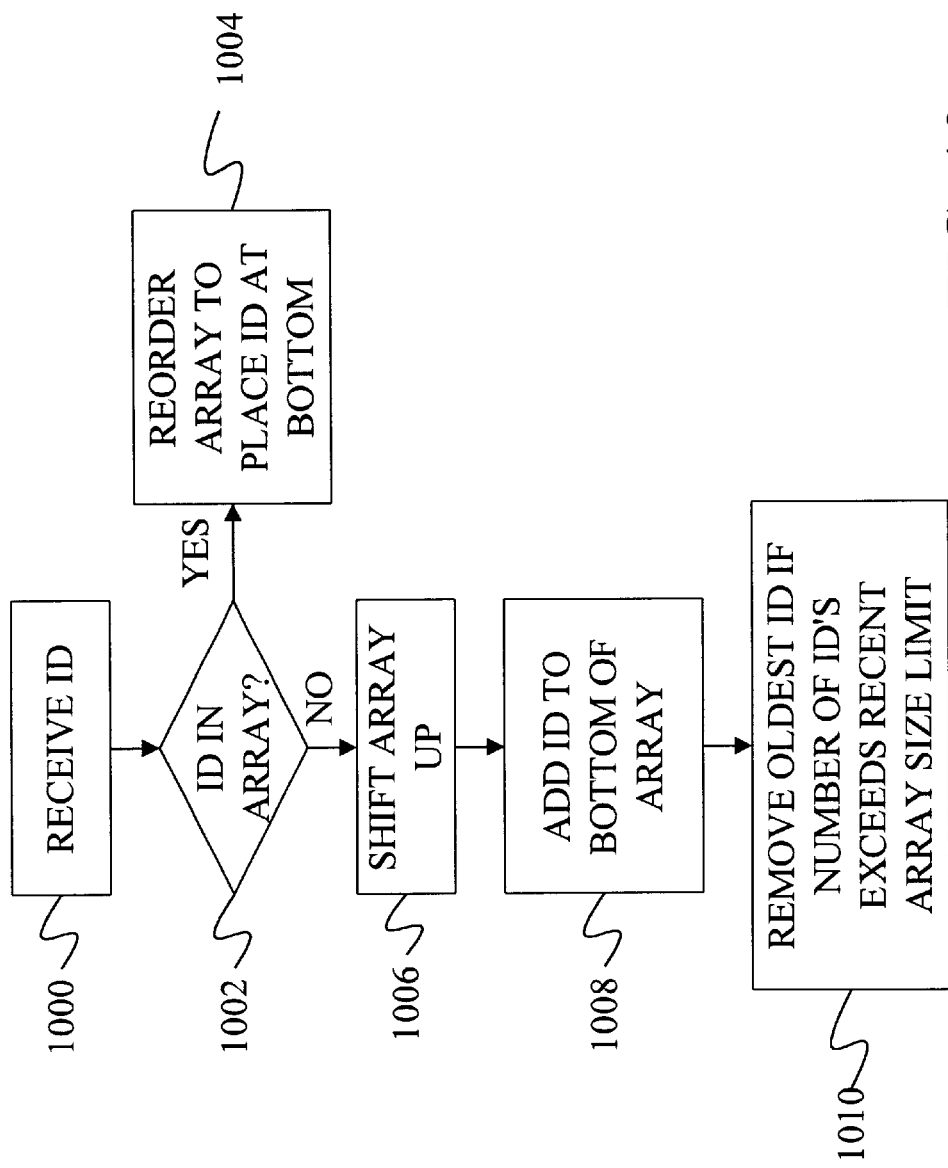
FIG. 10 is a flow diagram of a method for updating a recent array.

FIG. 10 provides a flow diagram of a method used by UpdateRecent component 908 to update recent array 902. In step 1000, the ID of the record that was just created or accessed is received by UpdateRecent component 908. At step 1002, component 908 searches for the ID in recent array/list 902. If the ID is in the array/list, the array is reordered at step 1004 so that the ID appears at the bottom of the array. In this context, the bottom of the array contains the newest ID's to be accessed and the top of the array contains the oldest ID's to be accessed. This type of array is sometimes referred to as a most-recently used (MRU) list.

If the ID is not in array 902, all of the ID's in the array are shifted up by one location at step 1006. The newest ID is then inserted at the bottom of the array at step 1008. If the addition of this ID caused the number of ID's in array 902 to exceed the maximum number that can be stored in the recent category, the oldest ID is removed from array 902 at step 1010. In the embodiment of FIG. 10 this occurs automatically during the shifting process of step 1006 because the array index of the oldest ID will become less than zero during the shift.

In other embodiments, the recent category list is not limited to a set number of contacts. Instead, the contacts in the recent category list are simply sorted based on when they are last used. In one such embodiment, all of the contacts in the contacts database are available in the recent category list but are sorted based on their last usage so that the most recently used contacts are at the top of the list.

One aspect of the present invention is that it provides a recent category without introducing a new user interface. This makes it easy for users to understand the category and allows a user to manipulate the entries in the category in the same manner that they manipulate entries in other categories.

Under some embodiments, the recent category is not displayed in the category list until after at least one record has been opened, created or received. This prevents the user from seeing the Recent label until there is a recent entry to display.

Although the recent category list was described above as being produced automatically by the system, in some embodiments the user has the ability to manually add contacts to the recent category list. These contacts can either be locked into the recent category list so that they are always present or may be shifted out of the recent category list over time in the same manner as the contacts that are automatically added to the list. In further embodiments, the user may produce a separate "RECENT" category that the user manually populates and controls. In most such embodiments, this manual "RECENT" category would appear below the automatic "RECENT" category. This occurs because the automatic "RECENT" category in most embodiments is always at the top of the category list, while all other categories are organized alphabetically below it. Such ordering helps users to easily distinguish between the two "RECENT" categories.

Although the present invention has been described with reference to particular embodiments, workers skilled in the art will recognize that changes may be made in form and detail without departing from the spirit and scope of the invention.

What is claimed is:

1. A method of generating a user interface in a hand-held computing device, the method comprising:
    displaying a list of category labels, each label representing a collection of database entries, at least one of the category labels being a recently accessed label that represents a list of recently accessed entries, and at least one other category label being an all categories label that represents a full list of all entries in the database;
    receiving an indication that a user has selected the recently accessed label;
    displaying the list of recently accessed entries such that the entries are capable of being manipulated by the user in the same manner as entries that are displayed when the user selects the all categories label.

2. The method of claim 1 further comprising before displaying a list of category labels displaying at least a portion of the full list of entries, the list of recently accessed entries representing a subset of the full list of entries.

3. The method of claim 1 further comprising:
    displaying a category-list label;
    receiving an indication that a user has selected the category-list label; and
    wherein the step of displaying a list of category labels is performed in response to the user selecting the category-list label.

4. The method of claim 1 wherein displaying a list of category labels comprising displaying the list of category labels in a drop-down list.

5. The method of claim 1 wherein displaying the list of recently accessed entries comprises accessing an array to obtain a list of recently accessed entries.

6. The method of claim 5 further comprising inserting an entry into the list of recently accessed entries when a user first adds the entry to the database.

7. The method of claim 5 further comprising inserting an entry into the list of recently accessed entries when a user opens an entry.

8. The method of claim 5 further comprising inserting an entry into the list of recently accessed entries when a user receives an entry from a remote source.

9. A computer-readable medium having computer-executable instructions for performing steps on a hand-held device having a display, the steps comprising:
    storing a full set of database records in a database;
    designating a subset of the full set of database records as recently accessed records based on the records in the subset being the most recently accessed records in the database;
    displaying a first set of entries, each entry comprising the contents of at least one field for each record in the subset of recently accessed records;

receiving an indication that the user has selected one of the displayed entries;

receiving a command to modify the selected entry;

modifying the selected entry's corresponding record in the database based on the command to modify the selected entry; and displaying a second set of entries such that each command used to modify an entry in the second set of entries produces a change in the entry's corresponding record that is the same as a change produced in a corresponding record for an entry from the first set of entries when that command is used to modify an entry in the first set of entries, each entry in the second set comprising the contents of at least one field for each record in a set of database records that is different from the subset of recently accessed records, the second set of entries indicating the change to the selected entry.

10. The computer-readable medium of claim 9 having computer-executable instructions for performing the further steps of:

displaying a list of categories before displaying the set of entries, the list of categories comprising a recent category label;

receiving an indication that the user has selected the recent category label; and wherein the step of displaying the set of entries is performed in response to the user selecting the recent category label.

11. The computer-readable medium of claim 10 wherein displaying the list of categories comprises displaying the list of categories in a pull-down menu in response to a user selecting a displayed categories label.

12. The computer-readable medium of claim 9 wherein receiving a command to modify the selected entry comprises receiving a command to delete the entry.

13. The computer-readable medium of claim 12 wherein modifying the selected entry's corresponding record in the database comprises deleting the entry's corresponding record from the database.

14. The computer-readable medium of claim 9 wherein designating a subset of the full set of database records as recently accessed records comprises storing record ID's for the most recently accessed records in a most recently used list.

15. The computer-readable medium of claim 14 wherein designating a subset of the full set of database records as recently accessed records further comprises adding a record ID to the most recently used list when the record associated with the record ID is first added to the database.

16. The computer-readable medium of claim 14 wherein designating a subset of the full set of database records as recently accessed records further comprises adding a record ID to the most recently used list when the record associated with the record ID is viewed by the user.

* * * * *